United States Patent
Takabayashi

(10) Patent No.: US 6,817,834 B2
(45) Date of Patent: Nov. 16, 2004

(54) IMPELLER FOR FLUID TRANSMITTING SYSTEM

(75) Inventor: Masatoshi Takabayashi, Shizuoka (JP)

(73) Assignee: Yutaka Giken Co., Ltd., Hammatsu (JP)

( * ) Notice: Subject to any disclaimer, the term of this patent is extended or adjusted under 35 U.S.C. 154(b) by 2 days.

(21) Appl. No.: 10/442,186

(22) Filed: May 21, 2003

(65) Prior Publication Data

US 2004/0001756 A1 Jan. 1, 2004

(30) Foreign Application Priority Data

May 21, 2002 (JP) ........................................ 2002-146524

(51) Int. Cl.[7] ............................................. F04D 29/38
(52) U.S. Cl. ................ 416/180; 416/197 C; 416/213 A
(58) Field of Search ............................. 416/180, 197 C, 416/213 A, 213 R

(56) References Cited

U.S. PATENT DOCUMENTS 2,429,503 A * 10/1947 Zeidler ........................ 416/180
5,813,505 A * 9/1998 Olsen et al. ................ 192/3.28
6,371,728 B1 * 4/2002 Gomi et al. ............ 416/197 C

FOREIGN PATENT DOCUMENTS

JP           58-97448           6/1983

* cited by examiner

Primary Examiner—Ninh H. Nguyen
(74) Attorney, Agent, or Firm—Arent Fox, PLLC.

(57) ABSTRACT

In an impeller for a fluid transmitting device, a cylindrical section is integrally formed at an inner peripheral edge of a shell and bent axially to extend through an inner periphery of a retainer plate, and a brazing material sump is provided between an outer peripheral surface of the cylindrical section and an inner peripheral surface of the retainer plate. The cylindrical section is fitted over an outer peripheral surface of a hub and welded to the hub on a side of an outer surface of the shell. Thus, even if a positioning flange is eliminated from the hub, the shell can be supported on the hub at an appropriate attitude, and it is possible to prevent a welding defect between the shell and the hub due to melting of a brazing material between the shell and the retainer plate.

4 Claims, 3 Drawing Sheets

IMPELLER FOR FLUID TRANSMITTING SYSTEM

BACKGROUND OF THE INVENTION

1. Field of the Invention

The present invention relates to an impeller for a fluid transmitting device used for vehicles or industrial machines, including a torque converter and a fluid coupling, and particularly to an improvement in impeller for a fluid transmitting device, including a bowl-shaped or annular shell, a plurality of blades coupled to an inner side of the shell at predetermined locations, an annular retainer plate brazed to an inner side of the shell to retain radially inner ends of the blades, and a hub welded to an inner peripheral edge of the shell.

2. Description of the Related Art

A conventional impeller for a fluid transmitting device is already known, for example, as disclosed in Japanese Patent Publication No. 58-97448.

In the conventional impeller for the fluid transmitting device, in order to weld the shell and the hub to each other, one side of the shell is butted against one side of a positioning flange formed around an outer periphery of the hub, and the attitude of the shell relative to the hub is maintained appropriately and in this state, a fillet welding is carried out between the positioning flange and the shell.

However, if the positioning flange is provided on the hub as described above, the axial wall thickness of the hub is increased by an amount corresponding to the wall thickness of the positioning flange, and also an increase in weight of the hub is provided.

Therefore, it is conceivable that the positioning flange is eliminated, and the inner peripheral edge of the shell is welded directly to an outer peripheral surface of the hub. However, in this case, the axial length of a portion of the shell fitted over the hub is shortened, so that the shell is liable to be inclined with respect to the hub, and it is difficult to maintain an appropriate attitude. Also in this case, there is a possibility that, during welding the shell and the hub to each other, a brazing material which has coupled the shell and retainer plate to each other may be molten by a welding heat to enter a weld zone between the shell and the hub, resulting in a welding defect.

SUMMARY OF THE INVENTION

Accordingly, it is an object of the present invention to provide an impeller for a fluid transmitting device, wherein even if the positioning flange is eliminated from the hub, the shell can be supported at an appropriate attitude on the hub and welded to the hub, and the welding defect between the shell and the hub due to melting of the brazing material between the shell and the retainer plate can be prevented.

To achieve the above object, according to a first feature of the present invention, there is provided an impeller for a fluid transmitting device, comprising a bowl-shaped or annular shell, a plurality of blades coupled to an inner side of the shell at predetermined locations, an annular retainer plate brazed to an inner side of the shell to retain radially inner ends of the blades, and a hub welded to an inner peripheral edge of the shell, wherein a cylindrical section is integrally formed at an inner peripheral edge of the shell and bent axially to extend through an inner periphery of the retainer plate, and a brazing material sump for receiving a brazing material molten during brazing of the shell and the retainer plate is provided between an outer peripheral surface of the cylindrical section and an inner peripheral surface of the retainer plate, the cylindrical section being fitted over an outer peripheral surface of the hub and welded to the hub on a side of an outer surface of the shell.

With the first feature, the axial length of a portion where the cylindrical section of the shell is fitted over the hub, can be set sufficiently longer than the wall thickness of the shell, and the shell can be supported on the hub with an appropriate attitude without forming a positioning flange such as that used in the prior art on the hub. Therefore, by welding the cylindrical section to the hub in the above-described state on the side of the outer surface of the shell, the welding accuracy between the shell and the hub can be enhanced. As a result, it is possible to reduce the axial wall thickness of the hub by an amount corresponding to the wall thickness of the positioning flange such as that used in the prior art, leading to a reduction in weight.

Moreover, the cylindrical section can also contribute to an increase in rigidity of a central portion of the shell to increase the coupling strength between the shell and the hub.

In addition, since the brazing material sump is provided between the outer peripheral surface of the cylindrical section and the inner periphery of the retainer plate through which the cylindrical section extends, the outer peripheral surface of the cylindrical section and the inner peripheral edge of the retainer plate are also brazed to each other by the brazing material received in the brazing material sump, and hence the brazing strength of the retainer plate to the shell can be increased.

Moreover, the brazing material received in the brazing material sump is kept retained in the brazing material sump by a capillary phenomenon even if it is molten by a welding heat during welding of the cylindrical section and the hub to each other. Therefore, it is possible to avoid that the molten brazing material enters a weld zone between the cylindrical section and the hub, thereby preventing a welding defect.

According to a second feature of the present invention, in addition to the first feature, the cylindrical section is formed so that it extends through the inner periphery of the retainer plate and protrudes from the inner side of the retainer plate.

With the second feature, even if the brazing material in the brazing material sump is molten by a welding heat during welding of the cylindrical section and the hub, the entrance of the brazing material into the weld zone between the cylindrical section and the hub can be reliably prevented, and at the same time the axial length of fitting of the cylindrical section over the hub can be increased to further stabilize the supporting of the shell on the hub and to further enhance the welding accuracy of the shell and the hub.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of a preferred embodiment with reference to the accompanying drawings.

Figure 1:
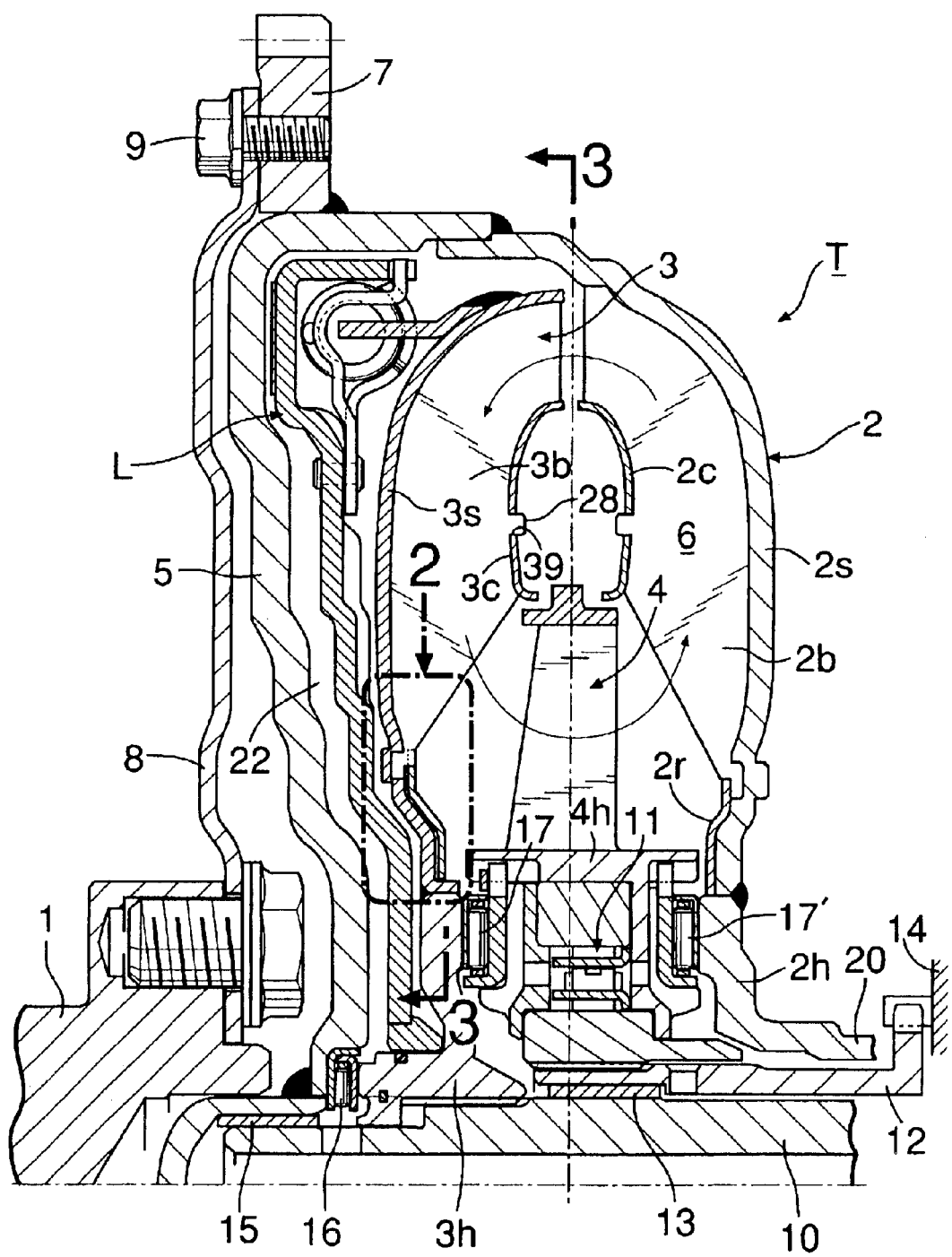
FIG. 1 is a vertical sectional side view of a torque converter according to an embodiment of the present invention.

Referring first to FIG. 1, a torque converter T as a fluid transmitting device includes a pump impeller 2, a turbine impeller 3 disposed in an opposed relation to the pump impeller 2, and a stator impeller 4 disposed between inner peripheral portions of the impellers 2 and 3. A circulation circuit 6 for transmitting a power by a working oil is defined between the three impellers 2, 3 and 4.

A side cover 5 is integrally connected to an outer peripheral portion of a shell 2S of the pump impeller 2 by welding to cover an outer side of the turbine impeller 3. A starting ring gear 7 is fitted over and welded to an outer peripheral surface of the side cover 5. A drive plate 8 coupled to a crankshaft 1 of an engine is secured to the ring gear 7 by a bolt 9. A thrust needle bearing 17 is interposed between a hub 3h of the turbine impeller 3 and the side cover 5.

An output shaft 10 arranged coaxially with the crankshaft 1 is disposed at a central portion of the torque converter T. The output shaft 10 is spline-fitted to the hub 3h of the turbine impeller 3 and rotatably supported on a support tube 5a at a central portion of the side cover 5 with a bearing bush 15 interposed therebetween. The output shaft 10 is a main shaft of a multi-stage transmission which is not shown.

A cylindrical stator shaft 12 is disposed around an outer periphery of the output shaft 10 and supports a hub 4h of the stator impeller 4 with a free wheel 11 interposed therebetween. A bearing bush 13 is interposed between the output shaft 10 and the stator shaft 12 for permitting the relative rotation between the shafts 10 and 12. The stator shaft 12 is non-rotatably supported at its outer end on a transmission case 14.

Thrust needle bearings 17, 17 are interposed between axially opposite end faces of the hub 4h of the stator impeller 4 and end faces of the hubs 2h and 3h of the pump impeller 2 and the turbine impeller 3 opposed to such axially opposite end faces, so that the axial movements of the turbine impeller 3 and the stator impeller 4 between the pump impeller 2 and the side cover 5 are restrained by the thrust needle bearings 17, 17 and the above-described thrust needle bearing 16.

An auxiliary-driving shaft 20 coupled to the pump impeller 2 is relatively rotatably disposed around an outer periphery of the stator shaft 12, so that an oil pump (not shown) for supplying the working oil to the torque converter T is driven by the auxiliary-driving shaft 20.

A clutch chamber 22 is defined between the turbine impeller 3 and the side cover 5 to communicate at its outer periphery with the circulation circuit 6. A known lock-up clutch L capable of directly coupling the turbine impeller 3 and the side cover 5 to each other is mounted in the clutch chamber 22.

Figure 2:
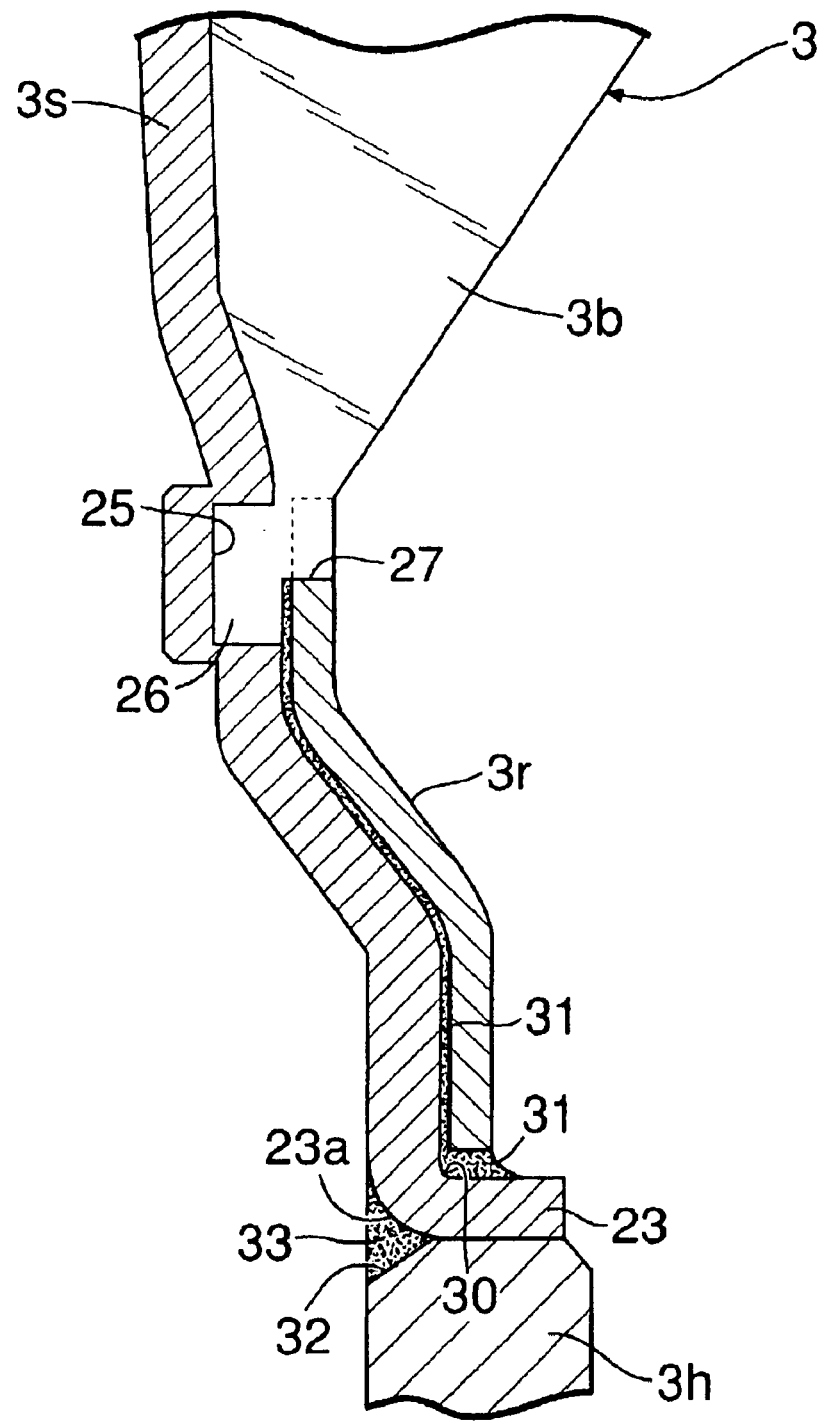
FIG. 2 is an enlarged view of a portion indicated by 2 in FIG. 1.
Figure 3:
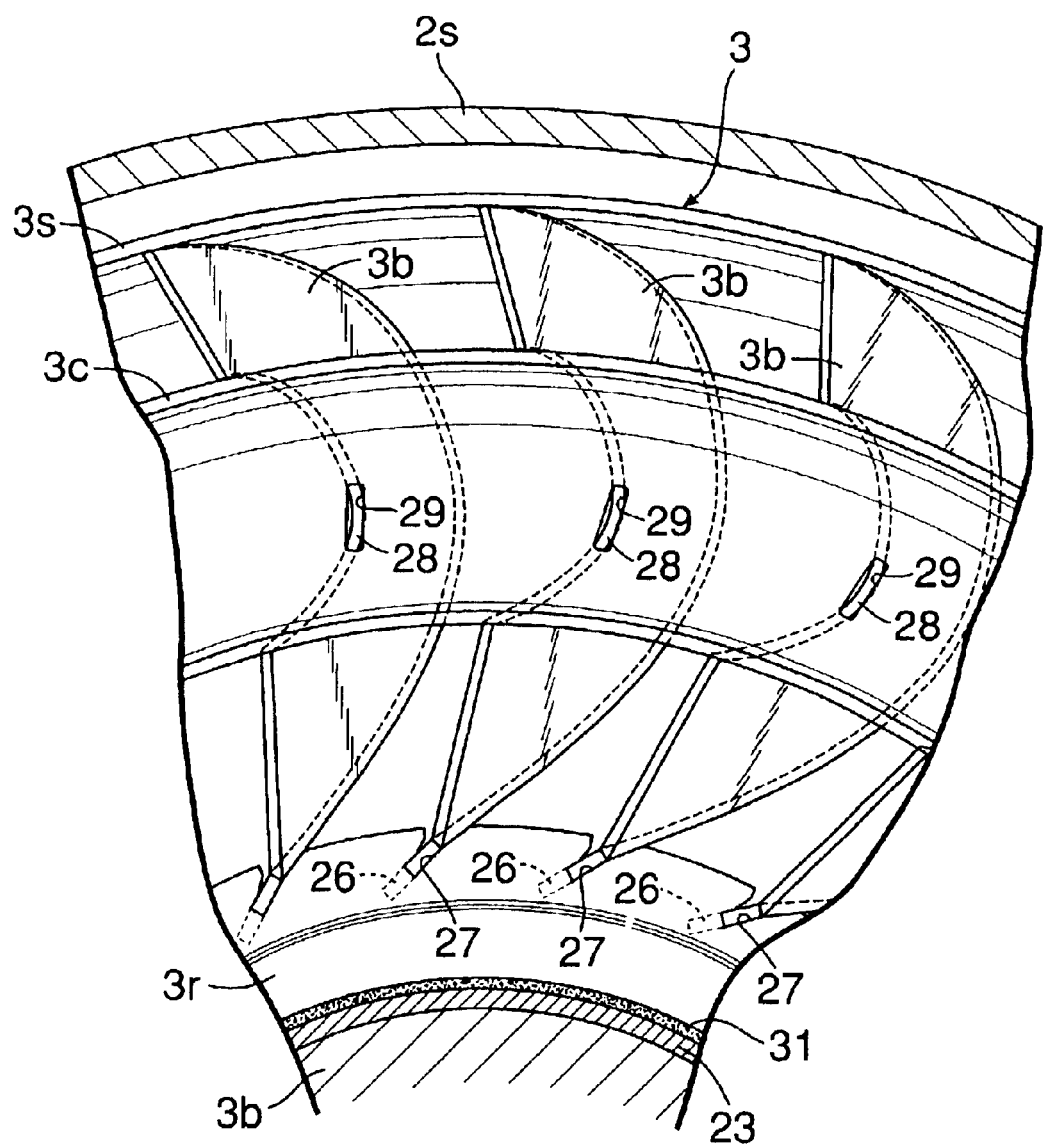
FIG. 3 is a sectional view taken along a line 3—3 in FIG. 3.

The turbine impeller 3 will be described in detail with reference to FIGS. 1 to 3.

The turbine impeller 3 is comprised of a bowl-shaped or annular shell 3S, a large number of blades 3b brazed to an inner side of the shell 3s at predetermined locations, an annular retainer plate 3r brazed to the inner side of the shell 3s to retain radially inner ends of the blades 3b, a core 3c which connects intermediate portions of all the blades 3b to one another, and the hub 3h welded to an inner peripheral edge of the shell 3s.

A cylindrical section 23 is integrally formed by burring at the inner peripheral edge of the shell 3s, and bent axially to extend through an inner periphery of the retainer plate 3r and to protrude from an inner side of the plate 3r. A brazing material sump 30 is provided between an outer peripheral surface of the cylindrical section 23 and an inner peripheral surface of the retainer plate 3r, so that a brazing material 31 molten during brazing of opposed side of the shell 3s and the retainer plate 3r is accumulated in the brazing material sump 30. The cylindrical section 23 is fitted over an outer peripheral surface of the hub 3h. A curved face 23a at an outer end of the cylindrical section 23 and a chamfer 32 of an outer periphery of the hub 3h opposed to the curved face 23a are coupled to each other by welding 33 on a side of an outer surface of the shell 3s.

Since the cylindrical section 23 integrally formed at the inner peripheral edge of the shell 3s is fitted over the outer peripheral surface of the hub 3h, the axial length of a portion of the cylindrical section 23 fitted over the hub 3h can be set at a value sufficiently larger than a wall thickness of the shell 3s. Therefore, the shell 3s can be supported on the hub 3h at an appropriate non-inclined attitude on the hub 3h without forming a positioning flange such as that used in the prior art on the hub 3h. Thus, the shell 3s and the hub 3h can be coupled to each other with their appropriate attitudes maintained by coupling the curved face 23a at the outer end of the cylindrical section 23 and the chamfer 32 on the outer periphery of the hub 3h opposed to the curved face 23a to each other via the welding 33 in the above-described state. As a result, the axial wall thickness of the hub 3h can be reduced by an amount corresponding to the wall thickness of the positioning flange such as that used in the prior art, leading to a reduction in weight.

Moreover, the cylindrical section 23 contributes to an increase in rigidity of the central portion of the shell 3s, and hence the coupling strength between the shell 3s and the hub 3h can be increased.

In addition, since the brazing material sump 30 is provided between the outer peripheral surface of the cylindrical section 23 and the inner periphery of the retainer plate 3r extending through the cylindrical section 23, if the shell 3s is kept horizontally with a tip end of the cylindrical section 23 turned upwards during brazing of the shell 3s and the retainer plate 3r, a surplus of the brazing material 31 molten between the shell 3sand the retainer plate 3r is received in the brazing material sump 30. Therefore, the outer peripheral surface of the cylindrical section 23 and the inner peripheral edge of the retainer plate are also brazed to each other by the brazing material 31 received in the brazing material sump 30, and thus the brazing strength between the retainer plate 3r and the shell 3s can be increased.

Furthermore, the brazing material 31 received in the brazing material sump 30 is kept retained in the brazing material sump 30 by a capillarity phenomenon during welding of the cylindrical section 23 and the hub 3h, even if it is molten by a welding heat. Therefore, it is possible to avoid that the molten brazing material 31 enters a weld zone between the cylindrical section 23 and the hub 3h, thereby preventing a welding defect. In this case, the protrusion of the cylindrical section 23 extending through the inner periphery of the retainer plate 3r from the inner side of the retainer plate 3r is effective for reliably preventing the entrance of the molten brazing material 31 into the weld zone between the cylindrical section 23 and the hub 3h, and also for increasing the axial length of the portion of the cylindrical section 23 fitted to the hub 3h to further stabilize the supporting of the shell 3s on the hub 3h.

Referring again to FIG. 1, the pump impeller 2 is also comprised of an bow-shaped or annular shell 2s, a large number of blades 2b brazed to an inner side of the shell 2s at predetermined locations, an annular retainer plate 2r brazed to the inner side of the shell 2s to retain radially inner ends of the blades 2*b*, a core 2*c* which connects intermediate portions of all the blades 2*b* to one another, and the hub 2*h* welded to an inner peripheral edge of the shell 2*s*.

The shell 2*s* of the pump impeller 2 has a sufficiently large wall thickness, as compared with the turbine impeller 3, and hence if the shell 3*s* is directly fitted over the outer peripheral surface of the hub 2*h*, a sufficient axial fitting length can be ensured. Therefore, the shell 2*s* can be supported with a good stability on the hub 2*h*. In addition, even during welding of the shell 2*s* and the hub 2*h*, a welding heat is difficult to transfer toward the retainer plate 2*r*, so that it is possible to prevent the melting of the brazing material between the retainer plate 2*r* and the shell 2*s*.

However, if the shell 2*s* of the pump impeller 2 is also formed to have a small wall thickness as in the turbine impeller 3, the pump impeller 2 can be also constructed as is the turbine impeller 3.

Although the embodiment of the present invention has been described in detail, it will be understood that various modifications in design may be made without departing from the spirit and scope of the invention defined in the claims. For example, the present invention is also applicable to a pump impeller or a turbine impeller for a fluid coupling having no stator impeller.

What is claimed is:

1. An impeller for a fluid transmitting device, comprising a bowl-shaped or annular shell, a plurality of blades coupled to an inner side of said shell at predetermined locations, an annular retainer plate brazed to an inner side of said shell to retain radially inner ends of said blades, and a hub welded to an inner peripheral edge of said shell, wherein a cylindrical section is integrally formed at an inner peripheral edge of said shell and bent axially to extend through an inner periphery of said retainer plate, and a brazing material sump for receiving a brazing material molten during brazing of said shell and said retainer plate is provided between an outer peripheral surface of said cylindrical section and an inner peripheral surface of said retainer plate, said cylindrical section being fitted over an outer peripheral surface of said hub and welded to said hub on a side of an outer surface of said shell.

2. An impeller for a fluid transmitting device according to claim 1, wherein said cylindrical section is formed so that it extends through the inner periphery of said retainer plate and protrudes from the inner side of said retainer plate.

3. An impeller for a fluid transmitting device according to claim 1 or 2, wherein said impeller is a turbine impeller.

4. An impeller for a fluid transmitting device according to claim 1 or 2, wherein said impeller is a pump impeller.

\* \* \* \* \*

UNITED STATES PATENT AND TRADEMARK OFFICE
CERTIFICATE OF CORRECTION

PATENT NO. : 6,817,834 B2
DATED : November 16, 2004
INVENTOR(S) : Takabayashi

It is certified that error appears in the above-identified patent and that said Letters Patent is hereby corrected as shown below:

Title page,
Item [73], Assignee, please change to read -- Yutaka Giken Co., Ltd., Shizuoka (JP) --.

Signed and Sealed this

Twelfth Day of April, 2005

JON W. DUDAS
*Director of the United States Patent and Trademark Office*